United States Patent [19]

Gentes et al.

[11] Patent Number: 5,285,933
[45] Date of Patent: Feb. 15, 1994

[54] PRESSURE HOLDING LIQUID BOTTLE FOR MOUNTING ON A BICYCLE

[75] Inventors: James J. Gentes, Soquel; Robert P. Lakes, Campbell, both of Calif.

[73] Assignee: Giro Sports Design, Inc., Soquel, Calif.

[21] Appl. No.: 767,997

[22] Filed: Sep. 30, 1991

[51] Int. Cl.$^5$ .............................................. B65D 37/00
[52] U.S. Cl. .................................. 222/148; 222/179.5;
    222/210; 222/212; 222/525; 222/610
[58] Field of Search ............... 222/153, 610, 180, 207,
    222/179.5, 148, 210, 212, 215, 465.1, 522, 525,
    531, 568; 224/35, 32 R, 39; 248/311.2, 313;
    280/288.4; 285/80, 91; 239/397.5, 530, 375,
    458; 81/3.4; 220/4.03, 480, 737

[56] References Cited

U.S. PATENT DOCUMENTS

| | | | |
|---|---|---|---|
| 2,591,531 | 4/1952 | Fishback | 285/80 |
| 3,221,952 | 12/1965 | De See | 222/568 X |
| 3,319,837 | 5/1967 | Mueller | 222/212 |
| 4,020,981 | 5/1977 | Nixdorff | 222/528 |
| 4,230,240 | 10/1980 | Laauwe | 222/212 |
| 4,253,588 | 3/1981 | Lester et al. | 222/153 |
| 4,345,704 | 8/1982 | Boughton | 222/179.5 X |
| 4,452,381 | 6/1984 | Freeman | 222/465.1 |
| 4,561,570 | 12/1985 | Zulauf et al. | 222/153 |
| 4,667,881 | 5/1987 | Michelotti | 239/458 |
| 4,778,068 | 10/1988 | Kohus | 220/4.03 |
| 4,927,065 | 5/1990 | Beck | 222/525 X |
| 5,040,709 | 8/1991 | Neugent | 224/35 |

FOREIGN PATENT DOCUMENTS 2253693 5/1974 Fed. Rep. of Germany ...... 248/313

Primary Examiner—Andres Kashnikow
Assistant Examiner—Philippe Derakshani
Attorney, Agent, or Firm—Limbach & Limbach

[57] ABSTRACT

A pressure holding liquid bottle for mounting on a standard bicycle liquid bottle cage or bracket and having a container for holding a liquid, a cap removably attached to an open end of the container and a friction grip removably mounted on the bottle. The cap is provided with a spout forming a disengagable pressure seal having a number of different positions. These positions include a closed seal position, a pair of partially open positions providing different fluid flows and an extended open position that permits washing the underside of a large diameter surface on the spout which facilities closing the spout. The container, grip and cap include a color from a group of different colors which allow different color combinations for the completed bottle. The bottle can have extensions which expand its capacity and a one way air vent allowing air to replace displaced liquid. The grip is an elastomer band which can include structure for constraining movement of the band relative to the rest of the bottle, and the spout includes a soft exterior portion near its free end.

15 Claims, 3 Drawing Sheets

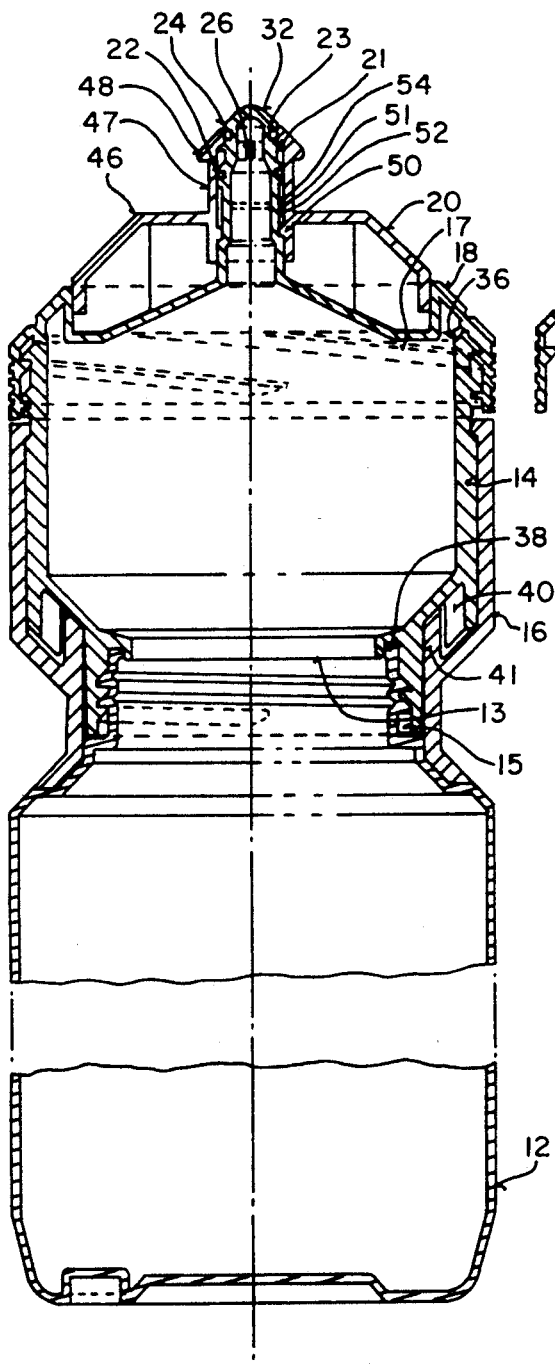
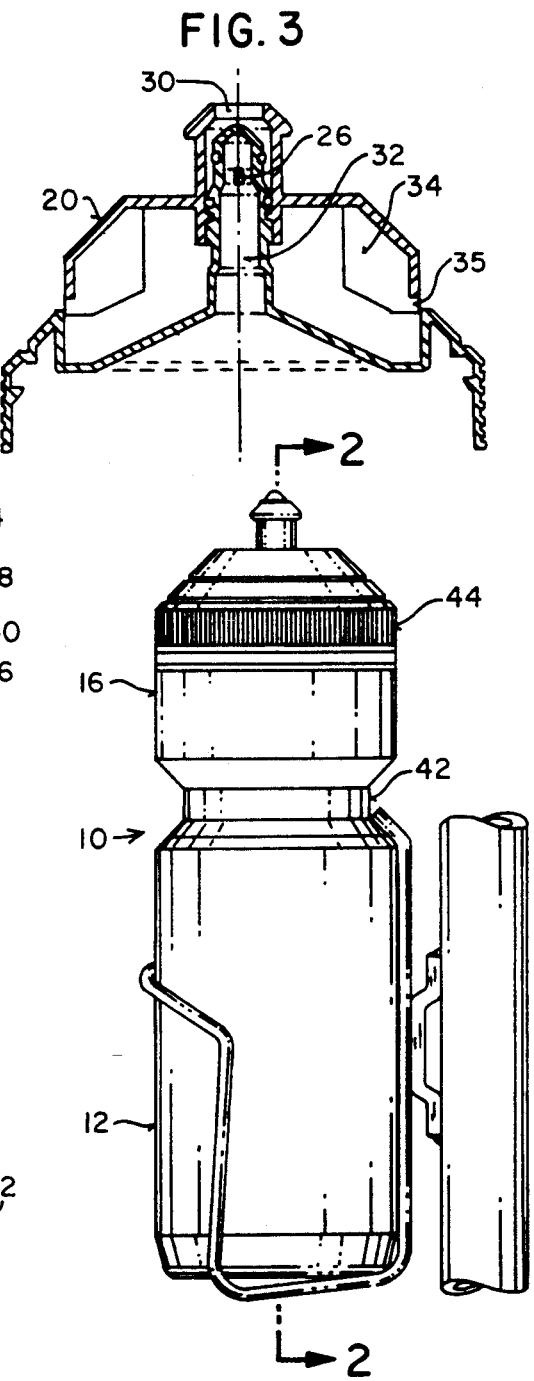
FIG. 3
FIG. 2
FIG. 1

PRESSURE HOLDING LIQUID BOTTLE FOR MOUNTING ON A BICYCLE

BACKGROUND OF THE INVENTION

1. Field of the Invention

The present invention relates to liquid carrying bottles, specifically those used in conjunction with bicycles.

2. Discussion of the Prior Art

Liquid bottles for use on a bicycle have been commercially available for some time. A standard bracket or cage has evolved to attach these bottles to bike frames. The standard cage is mounted on a bicycle to hold the bottle in an upright or upwardly inclined position. The cage supports the bottom portion of the bottle and, depending on the height of the bottle, either secures the top of the bottle or a groove in the side of the bottle. Typical liquid bottles consist of a cylindrical plastic container with an opening on top for filling that is less than about half the diameter of the container. A plastic cap containing a spout that opens and closes snaps over the opening.

The small diameter opening of the typical liquid bottle can make filling and cleaning difficult, and usually prevents a user from putting ice into the container. The spout is difficult to open and close because of its small size. Even when the spout is closed, the spout and cap can leak liquid when the bottle is inverted, squeezed, or shaken. Because ordinary liquid bottles cannot contain internal pressure, they are unsuitable for carrying carbonated beverages. Additionally, the bottle may be difficult to grasp without slipping, especially when it is wet or the hands of the rider are wet with perspiration.

SUMMARY OF THE INVENTION

Broadly stated, the present invention is directed to a liquid bottle suitable for mounting on a standard bicycle liquid bottle cage or bracket and having a container for holding a liquid and having an open end for filling and a closed end, a cap removably attached to the open end of the container and having a spout and a friction grip removably mounted on at least either the container or the cap.

An advantage of the present invention is that the bottle can be gripped by a bicycle rider for drinking purposes and also the grip assembly permits the bicycle rider to close the cap on the bottle and provide a pressure seal to prevent leakage of liquid from the bottle.

In accordance with another aspect of the present invention the cap is provided with a spout forming a disengagable pressure seal either to allow liquid to flow out of the container when in the open state or to provide a pressure seal preventing leakage of carbonated liquid in the closed state.

Another aspect of the invention is the provision of a wide opening in the container allowing the container to be easily cleaned and filled and allowing solids such as ice cubes to be put into the container.

In accordance with yet another aspect of the invention the caps, grips, and containers of the liquid bottles are made in a variety of colors allowing the user to mix and match caps and containers to form different color combinations.

Still another aspect of the invention is the provision of a large diameter surface on the spout to facilitate closing the spout and a larger external gripping area on the spout for opening the spout.

In accordance with still another aspect of the invention spirally formed ribs are provided on the underside of the spout to channel cleaning water directed under the spout to facilitate cleaning.

In yet another aspect of the invention extension housings are provided that can be added to the container, one on top of the next, to expand the capacity of the bottle.

In another embodiment the invention provides a spout with at least two open positions each having a different flow rate.

These aspects and other features and advantages of the present invention will become more apparent from a perusal of the following specification taken in conjunction with the accompanying drawings wherein similar characters of reference refer to similar elements in each of the several views.

DESCRIPTION OF THE DRAWINGS

FIG. 1 is a side elevational view showing the exterior of the liquid bottle.

FIG. 2 is an enlarged cross-sectional view of the liquid bottle shown in FIG. 1 taken along line 2—2 in the direction of the arrows and showing the spout in the closed position.

FIG. 3 is a view similar to a portion of FIG. 1 and showing the spout in the open and cleaning position.

DESCRIPTION OF THE PREFERRED EMBODIMENT

Figure 2A:
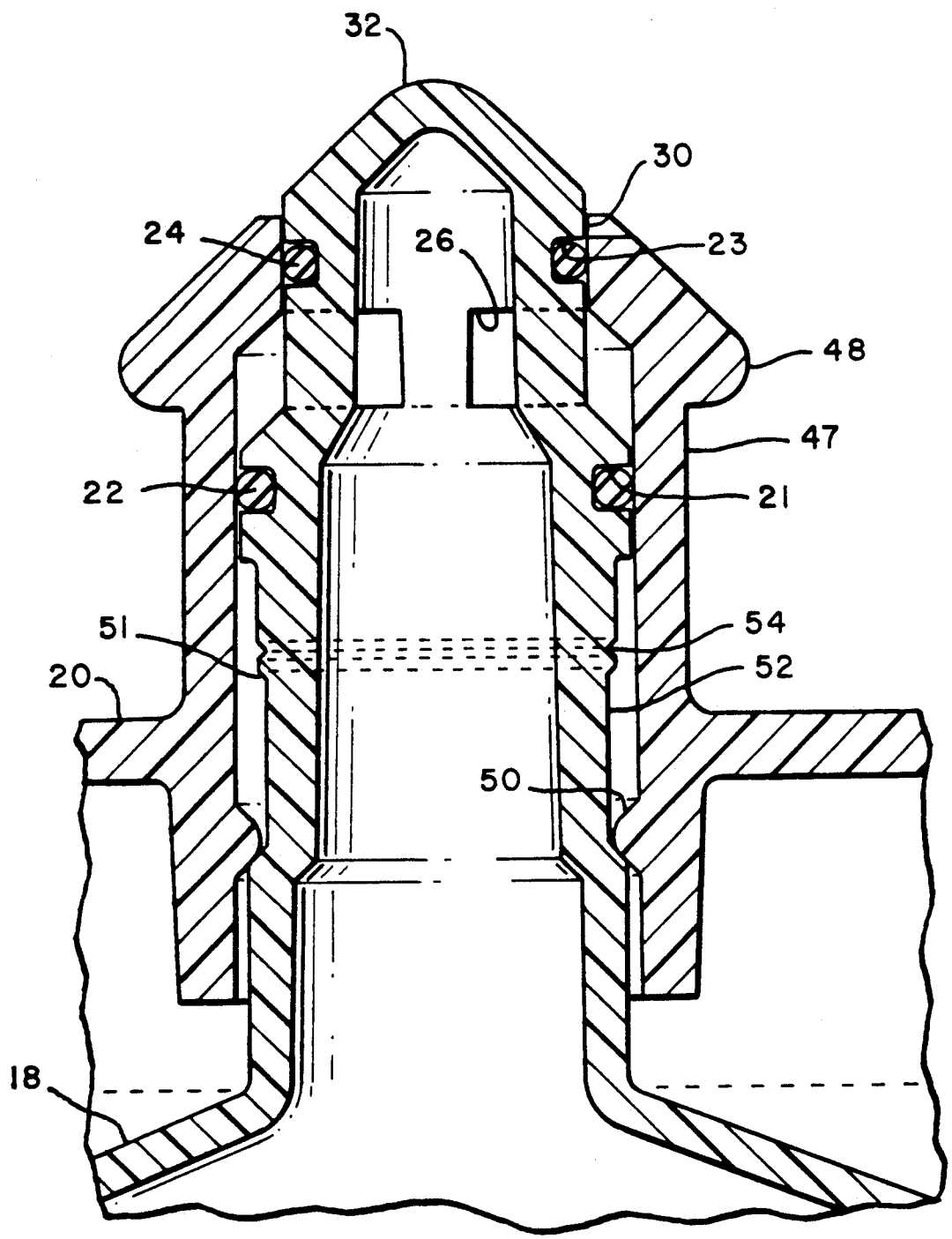
FIG. 2A is a further enlarged view of the upper spout portion of FIG. 2.

Referring now to FIGS. 1 and 2 of the drawings, the liquid bottle 10 of the preferred embodiment, has a flexible cylindrical container 12 with a male-threaded opening 13 on top. Attached to this opening 13 is an extension housing 14 having a female threaded opening 15 on its lower end. A gasket 38 placed in a suitable recess in the housing 14 contacts the lip of the container opening and forms a pressure seal when the housing 14 is screwed onto the container 12. Also, the exterior of the mating ends of the container 12 and housing 14 are shaped such that an annular groove 42 is formed between the two assembled parts for receiving a retaining member of the liquid bottle cage as shown in FIG. 1.

The exterior circumference of the housing 14 and the annular groove 42 are covered by an elastomer grip 16. Protruding fingers 40 from the housing 14 engage matching ribs 41 in the grip 16 to prevent the grip 16 from rotating with respect to the housing 14.

The upper end of the extension housing 14 has a male threaded opening 17 to which a cap 18 is threadably attached. A tapered ring 36 extends from the bottom of the cap 1B to contact the lip of the upper housing opening 17 and forms a pressure seal when the cap 18 is screwed onto the housing 14.

A hollow protrusion 32 extending upward from the center of the cap 18 has a pair of annular grooves 21 and 23 for accepting O-rings 22 and 24 on the protrusion's exterior near its upper end. The protrusion 32 also has radial slots 26 between the two O-rings 22 and 24. A spout 20 has a bore 30 through its center which slidably accepts the protrusion 32 of the cap 18. The bore 30 of the spout 20 contains an annular rib 50 which engages a stepped annular recess 52 in the circumference of the protrusion 32. This arrangement allows limited vertical sliding of the spout 20 with respect to the cap 18 but allows the spout 20 to be captivated by the cap 18.

In the preferred embodiment the container 12 is of low density polyethylene, the extension housing 14 is of polycarbonate, the cap 18 is of polypropylene, the spout 20 is of high density polyethylene, and the grip 16 is of Kraton (a proprietary thermoplastic rubber from Shell Chemicals.)

When the cap 18 is removed, the bottle may be filled through the opening 17 in the top of the extension housing 14. Filling is facilitated by the large diameter of the opening 17. The bottle may be filled to the top of the extension housing 14. The cap 18 is provided with a knurled outer circumference 44. The large diameter of this cap grip 44 and the grip 16 around the extension housing 14 make it easy to firmly secure the cap 18.

When the spout 20 is in the closed position as shown in FIG. 2, the liquid is sealed within the bottle by seals 22, 24, 36 and 38, even when the bottle is squeezed. The spout 20 may be moved into a first open position by grasping the spout diameter 47 and pulling up on external rib 48 until internal rib 50 contacts step 51 of recess 52. In the open position of the spout 20 the upper O-ring 24 no longer seals against the tip of the spout bore 30, enabling liquid to flow through the hollow protrusion 32 of the cap 18, pass through its radial slots 26 and flow out through the spout bore 30. Of course this flow must be initiated by squeezing the container 12 and/or inverting the bottle 10.

The spout 20 has a second open position that has twice the liquid flow rate as the first. This second open position is reached by pulling up on the spout as before until internal rib 50 rides past step 51 of recess 52 and engages detent 54. The spout 20 may be pulled past this second detented open position to a fully open cleaning position which partially exposes the underside of the spout 20 through an annular gap 35, as shown in FIG. 3. The underside of the spout is provided with spirally formed ribs 34 to channel cleaning water under the spout. This cleaning feature may be removed from the bottle without adversely affecting the other features of the present invention.

The spout 20 has a radially outward extending section having a large chamfered diameter 46 that allows the user to easily push the spout 20 closed.

To further describe and clarify the liquid bottle in its preferred embodiment, the following specifications are provided. They are not intended to be limitations to the design as these specifications are not necessarily critical to the operation of the present invention.

The overall length of the bottle is 9.18 inches. The diameters of the container, grip, and cap are all approximately 2.90. The capacity is over 22 fluid ounces. The liquid bottle will hold approximately 20 pounds per square inch internal pressure without leaking liquid. The filling opening at the top of the extension housing has an inside diameter of 2.48. The outside diameter of the spout used for closing the spout is 2.15 inches. The diameter and height (including lip) of the spout portion used for opening the spout are both 0.50 inches.

In an alternate embodiment the spout diameter 47 can be sleeved with a soft material such as a medium durometer Neoprene or made entirely from the material to cushion the user's teeth while drinking.

Figures 4, 5, 6:
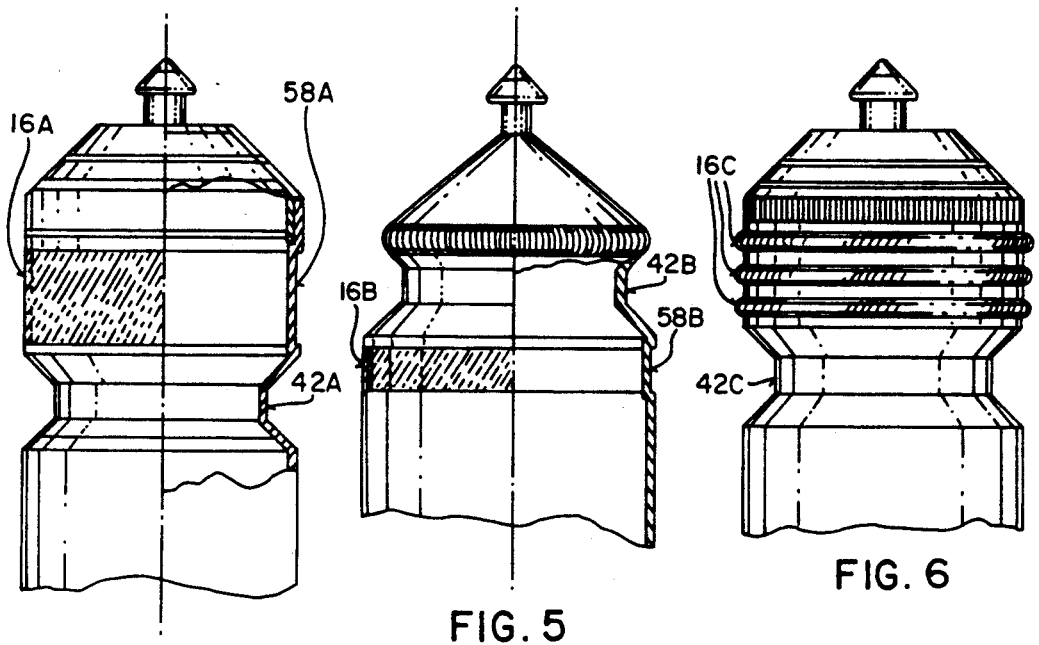
FIGS. 4 through 8 are side elevational views of the upper portion of the liquid bottle, some in cross-section or having half the figure in cross-section, showing features of alternative embodiments.
Figures 7, 8, 8A, 9:
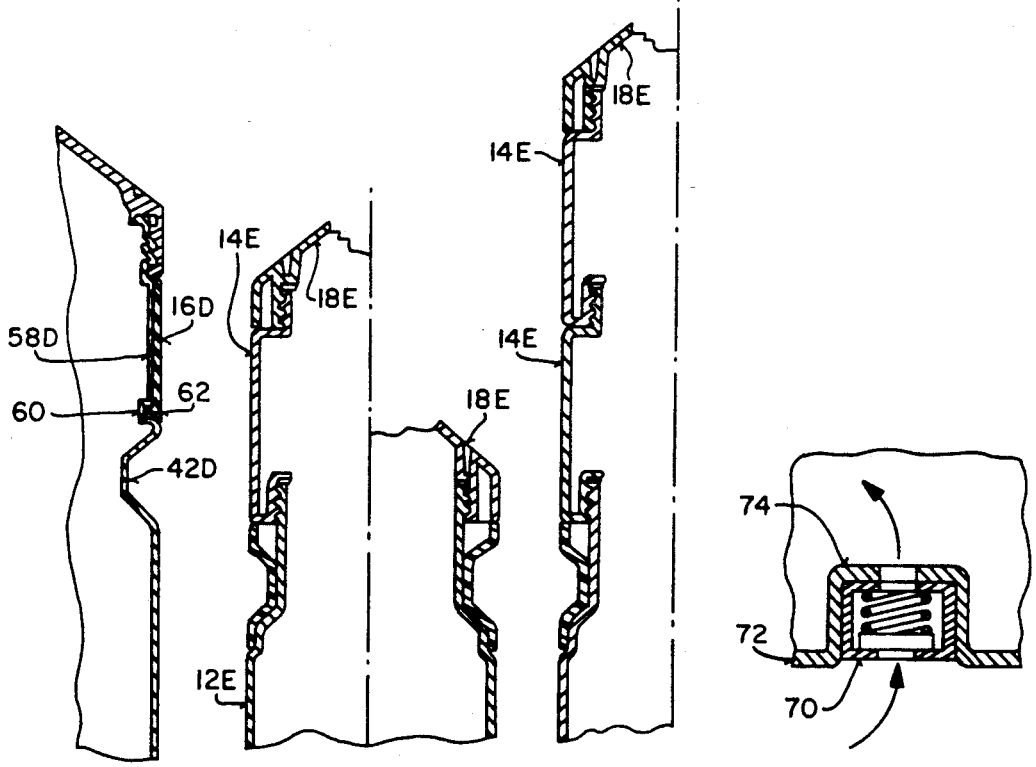
FIG. 9 is a cross-sectional side view of a check valve illustrating an alternative embodiment.

In alternative embodiments as illustrated in FIGS. 4, 5, and 7, the grip 16A, B or D may be positioned in an annular depression 58A, B or D, respectively, around the liquid bottle. Ridges or grooves (not shown) can be used in the grip and bottle to lock the grip rotationally with the bottle. In these embodiments the grip 16A, B or D may or may not cover the annular groove 42A, B or D, respectively, used in conjunction with the bicycle mounted cage. The embodiment shown in FIG. 7 has an additional channel 60 to receive a rib 62 of the grip 16D, further retaining the grip 16D. The embodiment shown in FIG. 5 has the grip 16B positioned below the annular groove 42B. The band shaped grips 16A and B shown in FIGS. 4 and 5 respectively can be cut from an extrusion.

In another embodiment the grip can include one or more O-rings 16C received in suitable recesses on the exterior of the bottle as shown in FIG. 6.

Referring to FIG. 8 and 8A, in another embodiment the bottle may be configured to allow the cap 18E to directly thread onto the container 12E, thereby enabling one or more extension housings 14E with complementary ends to be attached between the cap 18E and the container 12E.

In a final embodiment a check valve 70 such as shown in FIG. 9 is located in a pocket 74 of a wall 72 of the bottle allowing air into the bottle to replace displaced liquid but preventing air or liquid from escaping the bottle through the check valve 70.

It is envisioned that the various embodiments above can be combined with one another in a number of different ways.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

We claim:

1. A liquid bottle comprising:
   container means for holding a liquid and having an open end for filling with the liquid and a closed end including
      a vessel having a part forming the closed end of said container means and an opening, and
      an extension housing having a first end having a first opening forming the open end of said container means and a second end having a second opening removably attachable to the opening of said vessel and forming a pressure seal therewith,
   a cap removably attachable to the first end of said extension housing and having a spout;
   pressure sealing means located on said container and said cap for selectively sealing in the bottle a liquid which may be pressurized;
   mounting means located on said liquid bottle for mounting the liquid bottle on a standard bicycle water bottle bracket or cage in the form of an exterior annular groove at the junction between said vessel and said extension housing such that the bottle may be retained by the bracket regardless of whether said extension housing is attached to said vessel; and
   a friction grip elastomer band located on the circumference of said extension housing, the bottle further comprising means for inhibiting relative motion between said band and extension housing.

2. A pressure holding water bottle, suitable for mounting on a standard bicycle water bottle bracket or cage, comprising:

container means for holding a liquid and having an open end for filling with the liquid and a closed end, said open end having a diameter substantially as large as that of said container means;

a cap removably attachable to the open end of said container means and forming a pressure seal therewith; and a spout located on said cap and forming a disengagable pressure seal therewith, said spout having an open state and a closed state, in the open state said spout allowing liquid to flow out of said container means, and in the closed state said spout acting in cooperation with said pressure seals preventing leakage of liquid from the bottle, said spout including a radially outward extending section having a diameter substantially equal to the diameter of said open end of said container means for facilitating moving said spout from the open state to the closed state, said radially outward extending section of said spout including spirally formed ribs on its underside, the open state of said spout including a first position and a second position, the first position being a fully extended cleaning position in which said ribs are exposed and can channel external cleaning water in a spiral fashion to facilitate cleaning of said cap.

3. A pressure holding water bottle, suitable for mounting on a standard bicycle water bottle bracket or cage, comprising:

container means for holding a liquid and having an open end for filling with the liquid and a closed end, said open end having a diameter substantially as large as that of said container means;

a cap removably attachable to said open end of said container means and forming a pressure seal therewith;

a spout located on said cap and forming a disengagable pressure seal therewith, and having an open state and a closed state, in the open state said spout allowing liquid to flow out of said container means, and in the closed state said spout acting in cooperation with said pressure seals preventing leakage of liquid from the bottle, said spout including a radially outward extending section having a diameter substantially equal to the diameter of said open end of said container means for facilitating moving said spout from the open state to the closed state, said radially outward extending section of said spout including spirally formed ribs on its underside, the open state of said spout including a first position and a second position, the first position being a fully extended cleaning position in which said ribs are exposed and can channel external cleaning water in a spiral fashion to facilitate cleaning of said cap; and friction grip means removably mountable on said container means for gripping said water bottle and gripping said container means without slipping during opening and closing of said cap and said spout.

4. A pressure holding liquid bottle comprising container means for holding a liquid and having an open end for filling with a liquid and a closed end, said open end having a diameter substantially as large as that of said container means and wherein said container means further comprises a vessel having a part forming the closed end of said container means and having an opening, and an extension housings having a fist end having a first opening forming the open end of said container means and a second end having a second opening removably attachable to the opening of said vessel and forming a pressure seal therewith, a cap removably attachable to said open end of said container means and forming a pressure seal therewith;

a spout located on said cap forming a disengagable pressure seal therewith, and having an open state and a closed state, in the open state said spout allowing liquid to flow out of the said container means, and in the closed state said spout acting in cooperation with said pressure seals preventing liquid leakage of liquid from the bottle when under pressure, said spout including a radially outward extending section having a diameter substantially equal to the diameter of said open end of said container means for facilitating moving said spout from the open state to the closed state;

mounting means located on said liquid bottle for mounting the liquid bottle on a standard bicycle water bottle bracket or cage where in the junction therebetween said vessel and said extension housing forms an exterior annular groove between for engagement with the standard bracket on the bicycle, such that the bottle may be retained by the regardless whether said extension housing is attached to said vessel; and friction grip means removably mountable on said container for gripping said liquid bottle and gripping said container means without slipping during opening and closing of said cap and said spout.

5. A bottle as recited in claim 4, wherein said grip means includes an elastomer band located on the circumference of said extension housing, the bottle further comprising means for inhibiting relative motion between said band and extension housing.

6. A pressure holding water bottle, suitable for mounting on a standard bicycle water bottle bracket or cage, comprising:

a vessel for holding a liquid, having an open end;

a hollow extension housing for extending the liquid holding capacity of said vessel, and having a first open end and a second open end, the first open end removably connectable to the open end of said vessel forming a pressure seal therebetween and the second open end for filling with the liquid, the second open end having a diameter substantially as large as that of said vessel, said extension housing and said vessel forming an exterior annular groove therebetween for mounting the bottle on the standard bicycle cage;

a cap removably attachable to the open end of said extension housing and forming a pressure seal therewith, said cap having a hollow protrusion communicating with and pointing away from the open end of said extension housing, said protrusion having a plurality of sealable apertures near its free end;

a spout having a bore therethrough receiving the hollow protrusion of said cap forming a disengagable pressure seal with said cap protrusion around said sealable apertures, said spout having means for holding said spout in a first, second, and third position, in the first position said spout acting in cooperation with said pressure seals preventing leakage of liquid from the bottle, in the second position said spout allowing liquid to flow out of the bottle through the hollow protrusion and said spout, in the third position said spout acting as in second position and also exposing underside of said spout for cleaning, said spout further including a radially outward extending section having a diameter substantially equal to the diameter of the open end of said extension housing for facilitating moving said spout from the second and third positions to the first position, the radially outward extending section having spirally formed ribs on its underside which are exposed in the third position and can channel external cleaning water in a spiral fashion to facilitate cleaning of said cap; and an elastomer band removably mountable on circumference of said extension housing for gripping said water bottle, said band being longitudinally constrained by and covering the annular groove to form an exterior depression for mounting the bottle on the standard bike cage, said band and said housing each having protrusions and recesses that interlock the two parts, thereby rotationally constraining said band with respect to said housing.

7. A bottle as recited in claim 6, wherein the pressure seal formed between the open end of said vessel and the first open end of said extension housing includes a gasket.

8. A bottle as recited in claim 6, wherein the disengagable pressure seal formed between the protrusion of said cap and the bore of said spout comprises two spaced apart annular recesses near the free end of the protrusion and a pair of O-rings located in said annular recesses, said sealable apertures in protrusion lying between said O-rings.

9. A bottle as recited in claim 6, wherein said cap is threadably attached to said housing and said housing is threadably attached to said vessel.

10. A bottle as recited in claim 6, further comprising a one way air vent that allows air to enter the bottle to replace displaced liquid, but does not allow pressure to escape from the bottle.

11. A bottle as recited in claim 6, wherein the open state of said spout includes means for holding said spout in either of at least a first position and a second position, said first position acting to allow liquid to flow at one rate and said second position allowing liquid to flow at a second rate.

12. A bottle as recited in claim 6, wherein said spout includes a soft portion on its exterior near its free end.

13. A liquid bottle comprising: container means for holding a liquid and having an open end for filling with the liquid and a closed end, said open end having a diameter substantially as large as that of said container means:

a cap removably attachable to the open end of said container means;

a spout located on said cap and forming a disengagable seal therewith, said spout having an open state and a closed state, in the open state said spout allowing liquid to flow out of said container means, and in the closed state said spout acting in cooperation with said seal preventing leakage of liquid from the bottle, said spout including a radially outward extending section having a diameter substantially equal to the diameter of said open end of said container means for facilitating moving said spout from the open state to the closed state;

mounting means located on said liquid bottle for mounting the liquid bottle on a standard bicycle water bottle bracket or cage; and, 14. A bottle as recited in claim 13, wherein said container means further comprises spirally formed ribs on the underside of said radially outward extending section of said spout and wherein said ribs are exposed and can channel external cleaning water in a spiral fashion to facilitate cleaning of said cap when said spout is in the open state.

a vessel having a part forming the closed end of said container means and having an opening and an extension housing having a first end having a first opening forming the open end of said container means and a second end having a second opening removably attachable to the opening of said vessel and forming a pressure seal therewith, wherein the junction between said vessel and said extension housing forms an exterior annular groove therebetween for engagement with the standard bracket on the bicycle, such that the bottle may be retained by the bracket regardless of whether said extension housing is attached to said vessel.

15. A bottle as recited in claim 13, wherein said container means further comprises mounting means located on said liquid bottle for mounting the liquid bottle on a standard bicycle water bottle bracket or cage;

a vessel having a part forming the closed end of said container means and having an opening and a plurality of tube-like extension housing removable connected end to end with each other between said vessel opening and said cap, and all in communication with said vessel for the purpose of extending liquid capacity of said container means, pressure sealing means located between said extension housings, said extension housing having top portions substantially identical to a top portion of said vessel and having bottom portions substantially identical to a bottom portion of said cap.

* * * * *